UNITED STATES PATENT OFFICE.

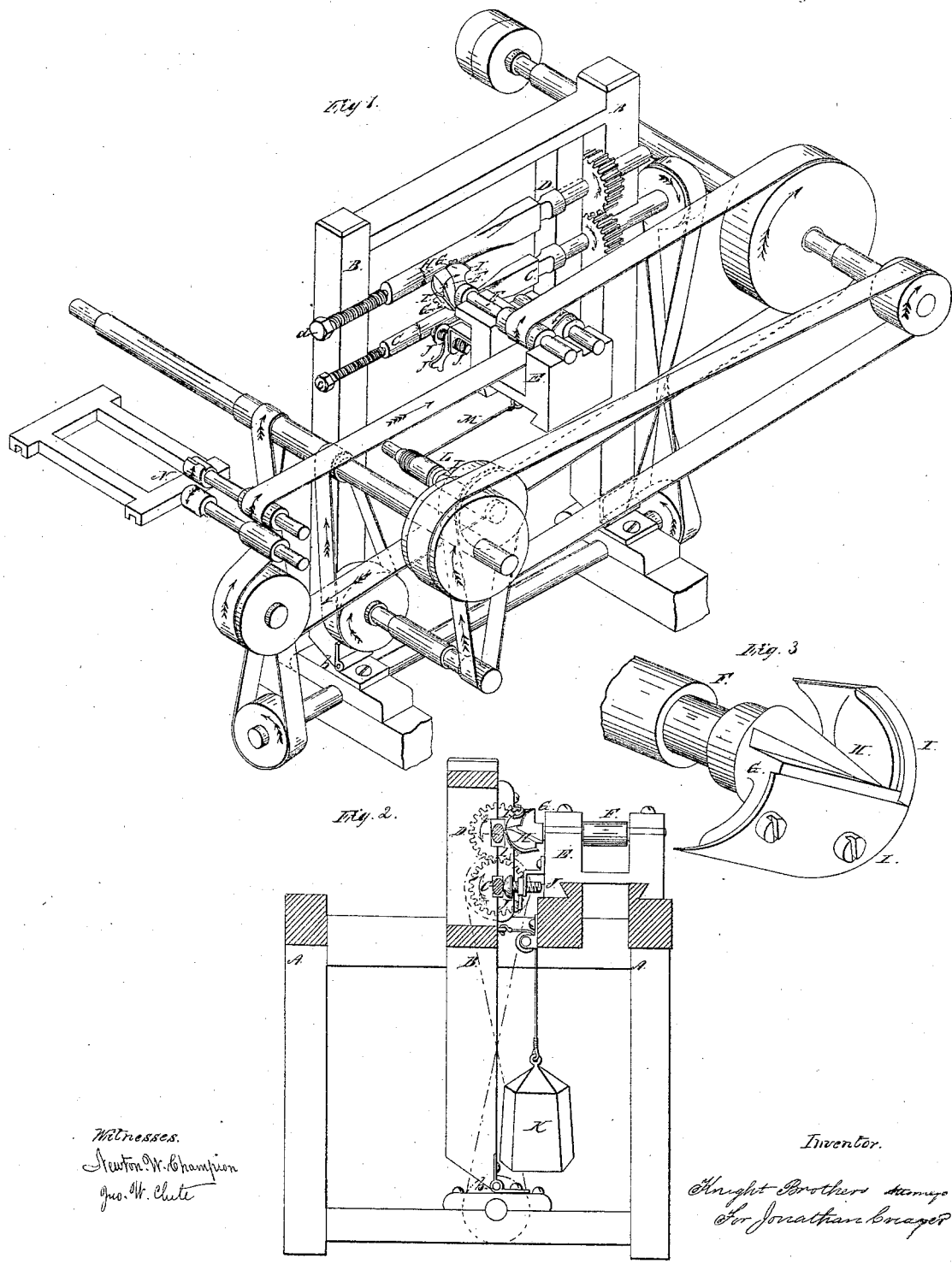

JONATHAN CREAGER, OF CINCINNATI, OHIO.

MACHINE FOR TURNING IRREGULAR FORMS.

Specification of Letters Patent No. 31,656, dated March 12, 1861.

*To all whom it may concern:*

Be it known that I, JONATHAN CREAGER, of Cincinnati, Ohio, have invented a new and useful Machine for Turning Irregular Forms; and I do hereby declare the following to be a full and exact description of the same, reference being had to the accompanying drawings, making part of this specification.

My invention relates to an automatic provision for forming spokes and other irregular objects with greater economy and accuracy than heretofore, the present improvement consisting in the employment, in connection with the spindle, pattern and gage of a lathe for turning irregular forms, of a hemispherical or convex cutter rotated on its own axis at right angles to the axis of rotation of the spindle as hereinafter more fully explained.

In the accompanying drawings Figure 1 is a perspective view of the operative mechanism without the frame. Fig. 2 is a vertical section in the plane of the axis of the cutter. Fig. 3 is an enlarged view of the cutter head.

A is the main frame supporting the driving and operating mechanism.

B is a swing frame hinged (*b*) at its lower edge to the main frame A, its upper portion affording journal bearing to a revolving pattern C and lathe mandrel D match geared thereto together with their respective tail screws *c d*. The pattern C is identical in form with that desired for the object to be turned but is as much smaller than it as its distance from the hinge *b* is shorter.

E is a slide rest upon the main frame.

Journaled in the rest E, in the plane of and at right angles to the lathe spindle D is a rotary cutter F whose head G has a hemispherical (or approximately hemispherical) form. This head has deep spiral channels H from its apex backward. The cutting edges of the bits I form collectively a nearly continuous arc of the hemisphere.

An adjustable gage or stop J of corresponding contour to the cutter F, but as much smaller as the pattern is smaller than the object to be turned, projects from the inner side of the slide rest E so as to bear against the pattern C. The shank *j* of the gage J is screw threaded so as to enable its accurate adjustment in or out as may be needful. It is secured in any required position by a binding nut *j'*. A weight K attached to the swing frame holds the pattern firmly against the gage J.

L is a conical sleeve connected by band or cord M to the rest E which sleeve being shifted by clutch or other means, is made at the option of the operator, to revolve with a conical shaft *l* whose motion is thereby communicated through the band M to impart feed motion to the rest E.

The impelling mechanism may be arranged as seen in the present illustration or in any other suitable manner.

Machines intended for forming spokes may have a tenoning apparatus N attached and actuated by their driving parts.

A spoke lathe provided with a cutter and constructed as herein described and rotated on an axis at right angles to that of the lathe spindle is found to work with a clean "dubbing" cut which is substantially free from any tendency to check score or spring the stuff, can be worked with very light power and be made to impart a very smooth and accurate finish. Such portions of the object as are approaching completion are acted on by the extreme apex only of the cutter, which part acts at other times to restrain the too sudden entrance of the blades into the stuff.

I am aware that convex cutters have previously been employed, rotated on axes parallel with or at oblique angles to those of the objects acted upon.

I claim as new and of my invention herein—

The combination with the spindle D, pattern C and gage J of a machine for turning irregular forms; of the cutter G H I, having a hemispherical or approximately hemispherical contour and rotated on its axis at right angles to the axis of rotation of the spindle D substantially as and for the purposes set forth.

In testimony of which invention, I hereunto set my hand.

JONATHAN CREAGER.

Witnesses:
Geo. H. Knight,
Francis Millward.